United States Patent [19]

Ohba

[11] Patent Number: 5,200,591
[45] Date of Patent: Apr. 6, 1993

[54] ELECTRIC DISCHARGE CONTOUR MACHINING METHOD

[75] Inventor: Nobuaki Ohba, Aichi, Japan

[73] Assignee: Mitsubishi Denki K.K., Tokyo, Japan

[21] Appl. No.: 792,934

[22] Filed: Nov. 15, 1991

[30] Foreign Application Priority Data

Nov. 29, 1990 [JP] Japan ................. 2-333279

[51] Int. Cl.$^5$ .................... B23H 1/00; B23H 7/32
[52] U.S. Cl. ..................... 219/69.17; 219/69.15; 219/69.16
[58] Field of Search ............. 219/69.17, 69.15, 69.16, 219/69.2; 204/224 M

[56] References Cited

U.S. PATENT DOCUMENTS

| | | | |
|---|---|---|---|
| 2,813,966 | 11/1957 | Matulaitis | 219/69.15 |
| 3,271,848 | 9/1966 | Montandon | 219/69.15 |
| 3,440,156 | 4/1969 | Dickson | 219/69.16 |
| 3,531,615 | 9/1970 | Zammit | 219/69.16 |
| 4,096,371 | 6/1978 | Lozon | 219/69.17 |
| 4,288,675 | 9/1991 | Inoue | 219/69.17 |

FOREIGN PATENT DOCUMENTS

| | | | |
|---|---|---|---|
| 63-245331 | 10/1988 | Japan . | |
| 768589 | 11/1980 | U.S.S.R. | 219/69.17 |
| 2061794 | 5/1981 | United Kingdom | 219/69.17 |

Primary Examiner—Goeffrey S. Evans
Attorney, Agent, or Firm—Sughrue, Mion, Zinn Macpeak & Seas

[57] ABSTRACT

An electric discharge contour machining method in which a plurality of rod-shaped portions having different outer diameters on one rod-shaped electrode are used to machine the contour shape of a workpiece. The workpiece is selectively machined in any of a plurality of contours by the single electrode having an optimum electrode diameter for each selected contour. Specifically, the method uses one rod-shaped electrode having a plurality of rod-shaped portions, each portion having a different outer diameter such that the workpiece contour having a small inner corner of first radius R is machined by the electrode portion having a small outer diameter and the workpiece contour having a large inner corner of second radius R is machined by the electrode portion having a large outer diameter.

7 Claims, 4 Drawing Sheets

ELECTRIC DISCHARGE CONTOUR MACHINING METHOD

BACKGROUND OF THE INVENTION

1. Field of the Invention

This invention relates to an electric discharge contour machining method for machining a workpiece with a simple electrode.

2. Description of the Prior Art

FIG. 4 is an overall view showing a structure of a conventional electric discharge machining apparatus.

In FIG. 4, reference numeral 1 denotes an electric discharge machining electrode 2 a workpiece to be machined, 3 a machining tank, and 4 machining solution such as insulation oil stored in the machining tank 3. Machining by the electric discharge machining apparatus is normally conducted in the machining solution 4 in the machining tank 3. Reference numeral 5 denotes a current generator for supplying an electric discharge pulse current to the electrode 1 and the workpiece 2, 8a a ball screw for moving a main spindle of the electric discharge machining apparatus in vertical directions such as upward and downward directions (Z-axis directions), 8c a ball screw for moving the workpiece 2 in lateral directions such as rightward and leftward directions (X-axis directions), 9a a servo motor for rotatably driving the Z-axis ball screw 8a, 9b a servo motor for rotatably driving a ball screw (not shown) for moving the workpiece 2 in longitudinal directions such as forward and reverse directions (Y-axis directions), 9c a servo motor for rotatably driving the X-axis ball screw 8c, and 10 a numerical controller for suitably controlling the drives of the servo motors 9a, 9b and 9c in response to a machining program. Reference numeral 11 denotes a head disposed at the top of the electric discharge machining apparatus, 12 a column of a frame for fixedly supporting the head 11, 13 a bed of a foundation of this electric discharge machining apparatus, 14b a movable table for moving the workpiece 2 together with the machining tank 3 in the longitudinal directions (Y-axis directions), 14c a movable table for moving the workpiece 2 together with the machining tank 3 in the lateral directions (X-axis directions), and 15 a spindle head of the main spindle of the electric discharge machining apparatus.

The conventional electric discharge machining apparatus is constructed as described above, and the workpiece 2 is electric discharge-machined by the electrode.

In the electric discharge machining operation, both the electrode 1 and the workpiece 2 are dipped in the machining solution 4 in the machining tank 3, and a pulse current is supplied from the pulse current generator to the electrode 1 and the workpiece 2. An intermittent electric discharge is generated in a machining gap between the electrode 1 and the workpiece 2 by the supply of the pulse current, and the workpiece 2 is machined by the electric discharge. In this case, since the electrode 1 is coupled to the Z-axis servo motor 9a via the ball screw 8a, the electrode 1 is moved vertically upward or downward in response to a command from the numerical controller 10. The Y-axis servo motor 9b is connected to the Y-axis movable table 14b via a ball screw (not shown), and the X-axis servo motor 9c is connected to the X-axis movable table 14c via the ball screw 8c. These movable tables 14b and 14c are suitably moved longitudinally and laterally in response to the command from the numerical controller 10. Thus, horizontal relative positional displacements of the electrode 1 and the workpiece 2 such as horizontal positioning or lateral machining, etc., can be arbitrarily altered. Therefore, the arbitrary position of the workpiece 2 can be electric discharge-machined in an arbitrary shape by adequately controlling the drives of the servo motors 9a, 9b and 9c.

The workpiece 2 may be contour-machined. As shown in FIGS. 5(a) and 5(b), a rod-shaped electrode 1 of a circular cross-section is attached to the spindle head 15, and the contour of the workpiece 2 is machined while continuously rotating the electrode 1. The machining shape is applied in advance to the numerical controller 10 by a program and the controller will determine the movement of the electrode with respect to the workpiece. The workpiece before machining and the programmed path of the electrode is shown in FIG. 5(a), and the workpiece shape after machining is shown in FIG. 5(b).

During the machining of a contour, the profile of the electrode 1 may become distorted, as shown in FIG. 6(a). Thus, even through one end of the electrode 1 remains attached to the spindle head 15, the remainder of the electrode is bent and presents a variable discharge gap to the surface of the workpiece being machined. At its opposite, unattached end, the electrode profile may deviate from the desired location by an amount Δ. Since the outer periphery of the electrode 1 is made of copper, tungsten, or similar conductive material, the electrode can have its shape maintained by machining. For example, an electrode correcting material 100 may be disposed in parallel with the desired electrode profile and used to correct the deviation. The deviation is corrected by electric discharge machining (EDM) of the rod surface so that the profile of the rod-shaped electrode 1 is parallel to the rotational axis of the spindle 15, as shown in FIG. 6(b).

While the EDM processing of the electrode will maintain a desired electrode profile, the outer diameter of rod will be varied along its length. This could be significant to the effective operation of the electrode in machining a desired contour. For example, the outer diameter of the rod-shaped electrode is determined on the basis of the smallest portion of the inner corner R of the contour machining shape of the workpiece 2. If that outer diameter is changed, the machining accuracy may be affected.

Also, since the conventional contour machining method is arranged as described above so that the electrode of the outer diameter is coincident with the smallest inner corner R of the contour machining shape of the workpiece, there arises a problem in that it may take a long machining time to machine large contours. This problem is due to the fact that the outer diameter of the electrode has been restricted to a small value due to the machining requirements for the inner corner R.

It is an object of the present invention to solve the above-described problem. It is a further object of the invention to provide an electric discharge contour machining method which can efficiently machine a variety of contours without being restricted by the dimensions of the smallest inner corner contour to be machined in a workpiece.

SUMMARY OF THE INVENTION

An electric discharge contour machining method according to the present invention coaxially provides a plurality of rod-shaped portions, having different outer diameters, on one rod-shaped electrode and machines the contour shape of a workpiece by selectively altering the working position of the respective rod-shaped portions.

In the electric discharge contour machining method according to the present invention, the workpiece is selectively machined in any of a plurality of contours by a single electrode having an optimum electrode diameter for each selected contour. Specifically, the method uses one rod-shaped electrode having a plurality of rod-shaped portions, each portion having a different outer diameter such that the workpiece contour having a small inner corner of first radius R is machined by the electrode portion having a small outer diameter and the workpiece contour having a large inner corner of second radius R is machined by the electrode portion having a large outer diameter.

DESCRIPTION OF THE PREFERRED EMBODIMENTS

The embodiments of this invention will be described with reference to the accompanying drawings.

Figure 1:
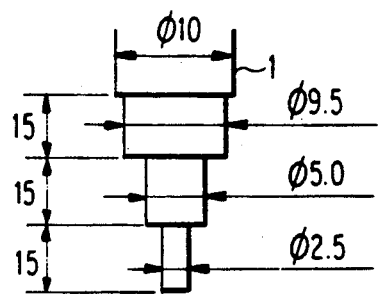
FIG. 1 is a side view of a rod-shaped electrode used in an embodiment of the present invention.
Figure 2A:
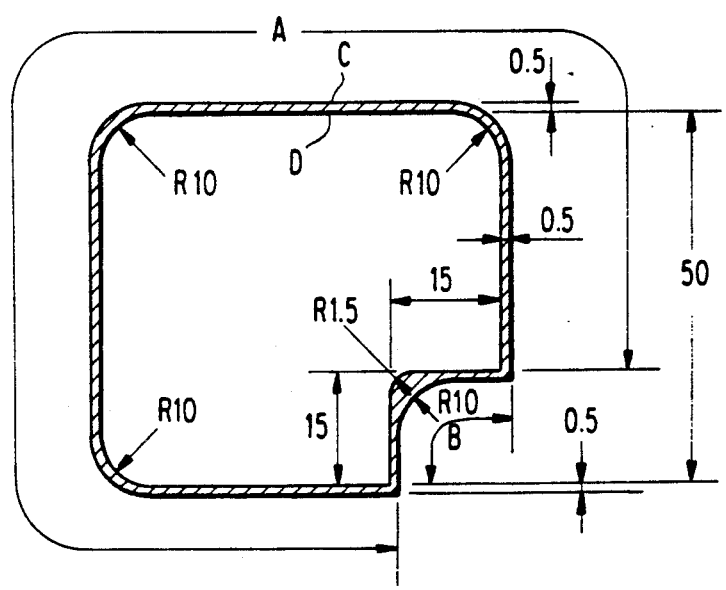
FIGS. 2(a) and 2(b) are views showing an example of a machined workpiece using the method and the rod-shaped electrode of the present invention.
Figure 2B:
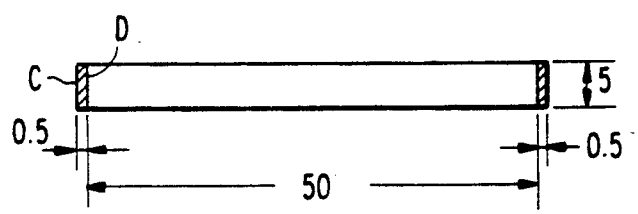
Figure 3A:
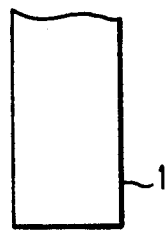
FIGS. 3(a), 3(b), 3(c), and 3(d) show the steps of forming and correcting the rod-shaped electrode in accordance with the present invention.
Figure 3B:
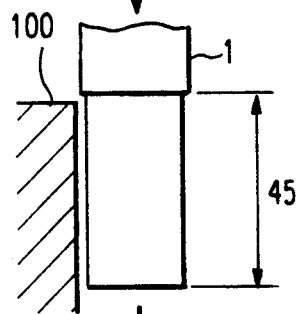
Figure 3C:
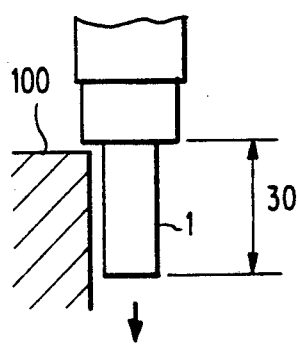
Figure 3D:
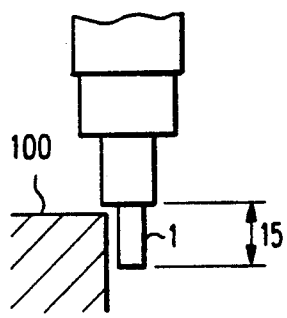
Figure 4:
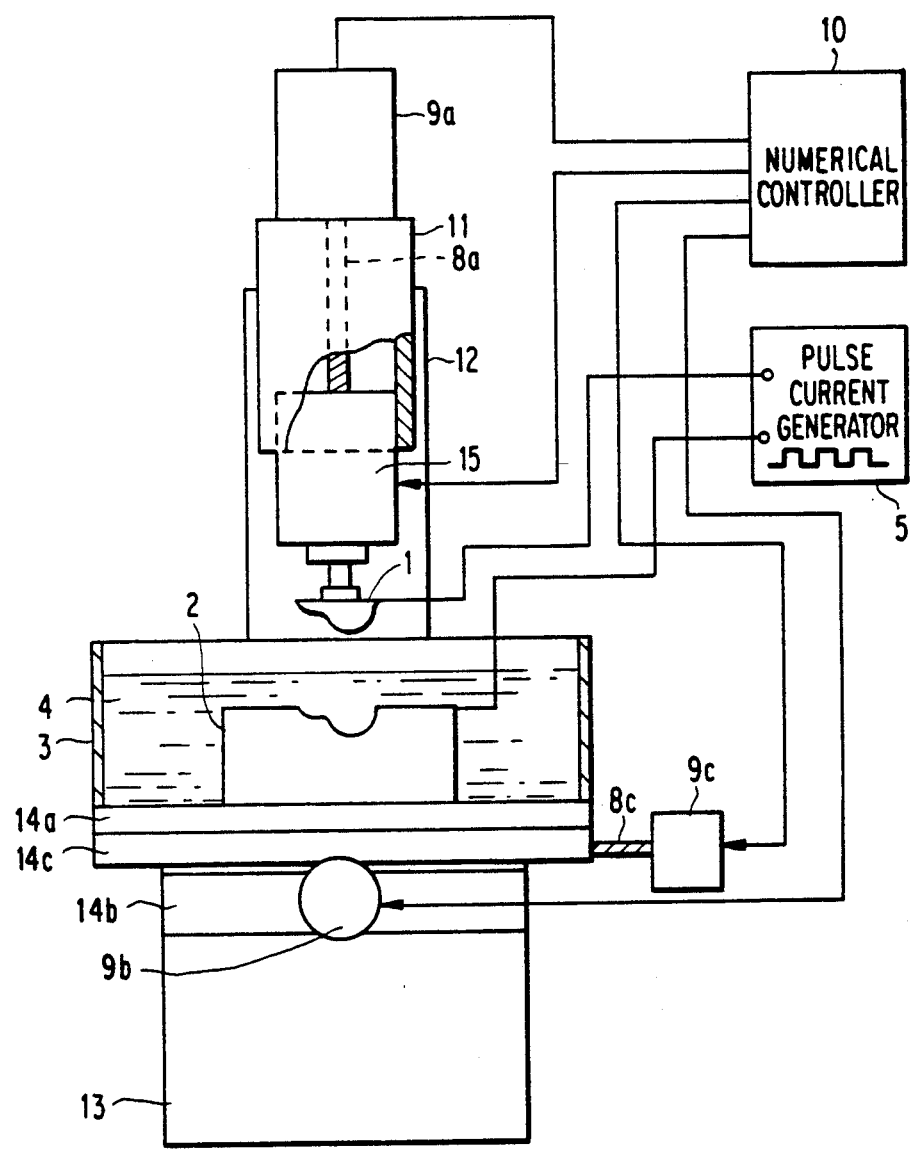
FIG. 4 is an overall view of the arrangement of a conventional electric discharge machining apparatus that may use the present invention.
Figure 5A:
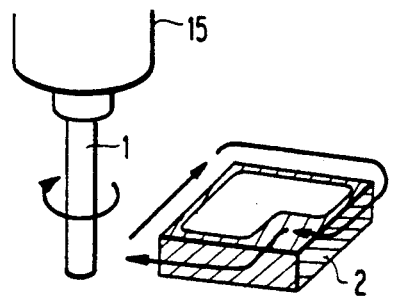
FIGS. 5(a) and 5(b) give a schematic view of a conventional contour machining method.
Figure 5B:
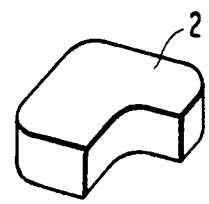
Figure 6A:
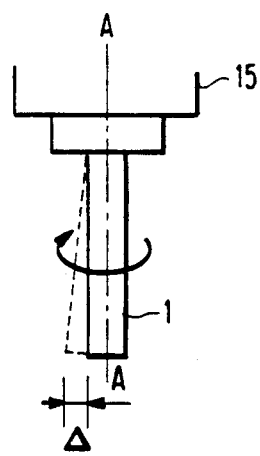
FIGS. 6(a) and 6(b) provide a schematic view of an electrode correcting step.
Figure 6B:
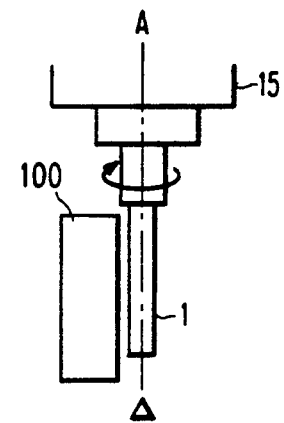

FIG. 1 is a side view showing an external shape of a rod-shaped electrode of one embodiment of the present invention. FIGS. 2(a) and 2(b) are views showing a machining example for the rod-shaped electrode, and FIGS. 3(a)–3(d) are views showing the steps of correcting the rod-shaped electrode.

In FIG. 1, reference numeral 1 denotes a rod-shaped electrode of a circular cross-section having rod-shaped portions sequentially including several different outer diameters beginning with a maximum outer diameter of 10 and proceeding to smaller diameters of 9.5, 5.0 and 2.5 mm. Each portion with a different diameter may have the same or different predetermined heights. The rod-shaped electrode 1 is attached to the main spindle 15 in a conventional manner and is used to machine the workpiece 2 in a predetermined shape.

FIGS. 2(a) and 2(b) show a relatively flat workpiece which, initially, is completely machined with a machining margin of 0.5 mm to a dimension of 50 mm on each of four sides. An area B which is partly intruded into its inside is roughly cut out to R10 by machining. The desired inner corner of this area is small, being only 1.5 mm in diameter. In FIG. 2(a), an outer dimension line, indicated by C, is formed in a shape by machining, and an inner line indicated by D is a target product size line. Therefore, a shaded area is to be contour-machined by electric discharge machining.

During the machining process, several steps are followed. A workpiece area A having no inner corner is machined by the electrode portion having 9.5 mm of outer diameter of the rod-shaped electrode 1. The workpiece area B having the inner corner R is roughly machined with the portion having 5.0 mm of outer diameter of the rod-shaped electrode 1 by moving the rod-shaped electrode 1 upward and opposing the portion having 5.0 mm of outer diameter to the workpiece 2. Then, the rod-shaped electrode 1 is moved upward, the portion having 2.5 mm of outer diameter of the rod-shaped electrode 1 is opposed to the workpiece 2, and the workpiece 2 is finish machined with the portion having 2.5 mm of outer diameter. With respect to the outer diameters of the electrode, where the diameter of the electrode is thicker, the machining condition can be increased and the machining time can be shortened. In brief, the diameters of the electrode are selected so that the total time of rough and finish machining can be shortened.

As shown in FIGS. 3(a)–(d), the multi-part rod-shaped electrode 1 is formed by sequentially cutting an electrode material having a large outer diameter (e.g., 100 mm) by using an electrode correcting material 100. The cutting operation takes place in a sequence of steps, thereby forming the rod-shaped electrode having desired outer diameters and heights.

In the embodiment described above, a flat surface is employed as the electrode correcting material 100 and is moved to different radial positions of the rod shape electrode. However, the electrode correcting material 100 may have a stepwise surface similar to the final shape of the rod-shaped electrode.

According to the method of the present invention as described above, the contour shape of the workpiece is machined by using the rod-shaped electrode having a plurality of rod-shaped portions, including different outer diameters and provided coaxially. Therefore, a workpiece can be machined by one electrode without restriction by an inner corner of the workpiece, thereby reducing the cost of the electrode material, enhancing the machining accuracy and shortening the machining time.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiments has been made only by way of example and that numerous changes in the details and arrangement of components may be made without departing from the spirit and scope of the invention as hereinafter claimed.

What is claimed is:

1. An electric discharge contour machining method for machining a workpiece to a desired shape having a plurality of contours, said method comprising the steps of:

continuously rotating a main spindle having coaxially extended therefrom a rod-shaped electrode having an axis of rotation and a plurality of rod-shaped portions, each of said plurality of rod-shaped portions having a circular cross-section and a different outer diameter;

creating an electrical discharge between said rod-shaped electrode and the workpiece;

machining the workpiece by moving said electrode along the desired shape of said workpiece; and selectively altering the relative position of said rod-shaped electrode to the workpiece by changing the position of said rod-shaped electrode so that selected ones of the plurality of rod-shaped portions machine the workpiece, wherein machining conditions used at the time of employment of each of said rod-shaped portions are selected such that finer machining is accomplished as the outer diameter of said rod-shaped portions is reduced.

2. The method of claim 1, wherein said selectively altering step includes changing at least the axial position of the rod-shaped electrode.

3. An electric discharge contour machining apparatus for machining a workpiece to a desired shape having a plurality of contours, said apparatus comprising:

a rod-shaped electrode having an axis of rotation and a plurality of rod-shaped portions, each of said plurality of rod-shaped portions having a circular cross-section and a different outer diameter;

means for continuously rotating said rod-shaped electrode;

means for creating an electrical discharge between said rod-shaped electrode and the workpiece;

means for machining the workpiece by moving said electrode along the desired shape of said workpiece;

means for selectively altering the relative position of said rod-shaped electrode to the workpiece by changing the position of said rod-shaped electrode so that selected ones of the plurality of rod-shaped portions machine the workpiece; and means for selecting machining conditions used at the time of employment of each of said rod-shaped portions such that finer machining is accomplished as the outer diameter of said rod-shaped portions is reduced.

4. An apparatus according to claim 3, wherein said selectively altering means includes means for changing at least the axial position of the rod-shaped electrode.

5. An apparatus according to claim 3, further comprising means for correcting an outer diameter of said reduced portions of said electrode.

6. An electric discharge contour machining method for machining a workpiece to a desired shape having a plurality of contours, said method comprising the steps of:

continuously rotating a spindle having coaxially extended therefrom a rod-shaped electrode having an axis of rotation and a plurality of rod-shaped portions, each of said plurality of rod-shaped portions having a circular cross-section and a different outer diameter;

creating an electrical discharge between said rod-shaped electrode and the workpiece;

machining the workpiece by moving said electrode along the desired shape of said workpiece; and selectively altering the relative position of said rod-shaped electrode to the workpiece by changing the position of said rod-shaped electrode so that selected ones of the plurality of rod-shaped portions machine the workpiece, wherein a constant predetermined gap is maintained between the selected ones of said plurality of rod-shaped portions and said workpiece as said workpiece is being machined.

7. An electric discharge contour machining apparatus according to claim 3, wherein a constant, predetermined gap is maintained between the selected ones of said plurality of rod-shaped portions and said workpiece as said workpiece is being machined.

* * * * *